United States Patent [19]

Uchida et al.

[11] Patent Number: 5,733,484
[45] Date of Patent: Mar. 31, 1998

[54] METHOD FOR MANUFACTURING CARBON PREFORM AND CARBON/CARBON COMPOSITE MATERIAL

[75] Inventors: Daisuke Uchida; Kazuyoshi Okamoto; Yoshio Soda, all of Yokohama, Japan

[73] Assignee: Nippon Oil Co., Ltd., Tokyo, Japan

[21] Appl. No.: 604,618

[22] Filed: Feb. 21, 1996

[30] Foreign Application Priority Data

Feb. 22, 1995 [JP] Japan ................................ 7-056760

[51] Int. Cl.⁶ ............................................. C01B 31/00
[52] U.S. Cl. ................. 264/29.1; 264/29.2; 264/29.6; 264/29.7; 423/447.1; 423/447.2; 423/447.4
[58] Field of Search ....................... 264/29.1, 29.2, 264/29.6, 29.7; 423/447.1, 447.2, 447.4

[56] References Cited

U.S. PATENT DOCUMENTS

| | | | |
|---|---|---|---|
| 3,971,669 | 7/1976 | Wrzesien et al. | 156/181 |
| 3,994,762 | 11/1976 | Wrzesien et al. | 156/148 |
| 4,988,492 | 1/1991 | Hara et al. | 423/447.4 |
| 5,433,937 | 7/1995 | Sohda et al. | 423/447.4 |

FOREIGN PATENT DOCUMENTS

| | | |
|---|---|---|
| 0 297 695 A3 | 1/1989 | European Pat. Off. . |
| 0554024 | 4/1993 | European Pat. Off. . |
| 0 601 808 A1 | 6/1994 | European Pat. Off. . |
| 62-191520 | 8/1987 | Japan . |
| 1-203267 | 8/1989 | Japan . |
| 5-201763 | 8/1993 | Japan . |
| 5-59863 | 9/1993 | Japan . |
| 6-172030 | 6/1994 | Japan . |

*Primary Examiner*—James Derrington
*Attorney, Agent, or Firm*—Kubovcik & Kubovcik

[57] ABSTRACT

A method for manufacturing a carbon preform comprising the steps of charging a container with pitch fibers obtained by melt spinning a carbonaceous pitch to fill therein during spinning, infusibilizing the thus filled pitch fibers, and calcining and molding the infusibilized pitch fibers under a uniaxial pressure, and a method for manufacturing a carbon/carbon composite material comprising densifying the carbon preform.

15 Claims, No Drawings

5,733,484

METHOD FOR MANUFACTURING CARBON PREFORM AND CARBON/CARBON COMPOSITE MATERIAL

BACKGROUND OF THE INVENTION

1. Field of the Invention

The present invention relates to a method for manufacturing a carbon preform and a carbon/carbon composite material.

2. Prior Art

A carbon/carbon composite material is light in weight and has excellent thermal resistance and, further, is superior in sliding movability, strength properties, fracture toughness, and thermal conductivity, etc., so that it has been used as industrial materials such as heat resistant materials, slidable materials, e.g., brake materials, and furnace materials.

In the manufacture of the carbon/carbon composite material, generally, a method for manufacturing a carbon preform and densifying it has been employed in order to obtain sufficiently high strength and sliding movability.

A method for manufacturing a carbon preform is disclosed in, e.g., Japanese Pat. Appln. Laid-Open Gazette No. Sho 49-62768. According to this method, a nonwoven fabric sheet obtained by needle-punching a carbon fiber aggregate is cut into an annular shape, and a plurality of annular nonwoven fabric sheets each obtained in this manner are stacked to a predetermined thickness, thereby preparing a carbon preform.

According to this method, however, large amounts of waste nonwoven fabric sheets remain after cutting. Although in the above gazette No. Sho 49-62768 this waste material is made into fibers by fibrillation and blending so that it can be recycled, since the fibers obtained in this manner have low quality, they cannot be used to form a carbon preform. Accordingly, the method disclosed in said gazette has a disadvantage that the yield becomes very low.

A method for manufacturing a carbon preform with an increased yield is disclosed in, e.g., Japanese Pat. Appln. Laid-Open Gazette No. Hei 5-201763. According to this method, infusibilized fibers obtained by spinning a carbonaceous pitch and subjecting the spun carbonaceous pitch to infusibilization are filled into a container by forced charging or free fall. The fibers are then calcined and molded under a uniaxial pressure, thereby manufacturing a carbon preform.

According to a method disclosed in Japanese Pat. Appln. Laid-Open Gazette No. Hei 5-59863, infusibilized fibers obtained by infusibilizing pitch fibers, and/or precarbonized fibers obtained by precarbonizing infusibilized fibers and having an oxygen/carbon atomic ratio of 0.10 to 0.52, are carbonized under pressure or with a press machine. The resultant fibers are further carbonized or graphitized as required under normal pressure, thereby manufacturing a carbon preform.

According to a method disclosed in Japanese Pat. Appln. Laid-Open Gazette No. Hei 1-203267, precarbonized fibers, which are obtained by precarbonizing, in an inert atmosphere at 350° to 800° C. infusibilized fibers obtained by infusibilizing pitch fibers, and which have a hydrogen/carbon atomic ratio of 0.41 or less, are carbonized under pressure or with a press machine, thereby manufacturing a carbon preform.

Furthermore, according to a method disclosed in Japanese Pat. Appln. Laid-Open Gazette No. Hei 6-172030, precursor fibers of infusibilized carbon fibers are molded under a uniaxial pressure at a processing temperature lower than a temperature at which infusibilization is carried out, and the resultant fibers are carbonized under normal pressure, thereby manufacturing a carbon preform.

When these methods are employed, the carbon preform can be manufactured by using necessary amounts of respective raw material fibers in accordance with the final size, thickness, or fiber volume content (Vf) of the target preform, without wasting the fibers to a certain degree. The carbonizing step of the infusibilized fibers, precarbonized fibers, or precursor fibers of carbon fibers is executed simultaneously with the molding step, thereby simplifying the steps.

According to the conventional manufacturing methods, however, an internal defect of the preform cannot sometimes be removed completely. Therefore, a further improvement is demanded in the manufacturing method.

SUMMARY OF THE INVENTION

It is, therefore, an object of the present invention to provide a method for manufacturing a carbon preform and a carbon/carbon composite material each having a very high yield and an excellent moldability in accordance with a simple process.

More specifically, the first aspect of the present invention relates to a method for manufacturing a carbon preform comprising the steps of charging a container with pitch fibers obtained by melt spinning a carbonaceous pitch to fill the container during spinning, infusibilizing the thus filled pitch fibers, and calcining and molding the infusibilized pitch fibers under a uniaxial pressure.

The second aspect of the present invention also relates to a method for manufacturing a carbon/carbon composite material, wherein the carbon preform obtained in the above manufacturing method is densified.

The carbon preform defined in the present invention refers to a product obtained by calcining infusibilized fibers under a uniaxial pressure and molding the calcined fibers.

The methods of manufacturing a carbon preform and a carbon/carbon composite material according to the present invention will be described in detail.

The pitch fibers defined in the present invention refer to fibers obtained by melt spinning a carbonaceous pitch using a known method and having an average diameter with a lower limit of 5 μm, preferably 7 μm, and an upper limit of 100 μm, preferably 30 μm, more preferably 15 μm, and most preferably 10 μm.

The type of carbonaceous pitch is not particularly limited and a known one can be employed in the present invention. It is particularly preferable to employ a coal- or petroleum-derived pitch having a softening point of 100° to 400° C. preferably 150° to 350° C. The carbonaceous pitch can be either an optical isotropic or anisotropic pitch. An optical anisotropic pitch containing 60 to 100% of optical anisotropic phase is preferably employed.

The spinning speed of the pitch fibers is usually 50 to 2,000 m/min, preferably 100 to 1,000 m/min, and more preferably 150 to 500 m/min. The filament count can be any arbitrary value in the range of 500 to 60,000, preferably 500 to 12,000.

The pitch fibers are filled into the container by charging during spinning.

The container into which the pitch fibers are to be filled by charging preferably has air-permeable bottom and/or side surface. Although the material of the container is not particularly limited, stainless steel is preferably employed. In particular, SUS 304 defined in JIS (Japanese Industrial Standard) is preferably employed.

It is desirable that the rate of hole area (porosity) of the side and/or bottom surface of the container that serves as a measure of air permeability be 10 to 80%, preferably 20 to 70%, and more preferably 30 to 60%. If the porosity is less than the lower limit of this range, the air permeability is decreased, so that drying of the greige goods and infusibilization cannot be performed efficiently. If the porosity is larger than the upper limit of the above-mentioned range, the fibers tend to separate apart in the steps after filling, making it difficult to maintain the shape of the preform.

The fibers can be filled into any shape as far as they can be filled uniformly. A shape close to the target carbon/carbon composite material is preferable so that the steps of forming the carbon/carbon composite material as the final molded product into a desired shape can be eliminated as much as possible. A cylindrical shape, e.g., a polygonal prism or a circular cylinder, is preferably employed, and a circular cylinder is preferably more employed. When the carbon/carbon composite material is used to form a brake material or the like, a circular cylindrical annular container in which another circular cylinder is concentrically at the center of a circular cylinder is preferably employed. A disk-shaped brake material having a concentric hole at the center is formed by using this circular cylindrical annular container.

The inner diameter (in the case of the circular cylindrical annular container, the inner diameter of the outer circular cylinder) can be determined arbitrarily in accordance with the size of the carbon preform, and is desirably set to 100 to 150%, preferably 110 to 130%, of the outer diameter of the target carbon preform.

In the present invention, the way of filling the pitch fibers in the container is not particularly limited as far as the pitch fibers can be filled uniformly. Usually, the container is placed on a movable table, and can be rotated and/or traversed in a predetermined direction within a plane on the table by either one or a combination of the following items (1) to (3):

(1) The container is traversed in the x-axis direction.

(2) The container is traversed in the x- and y-axis directions.

(3) The container is rotated about an arbitrary position inside or outside the bottom surface of the container as the center.

Traverse means to pivot or to move right to left on said table and includes a so-called zigzag movement.

As a preferable, practical combination of items (1), (2) and (3), the container is reciprocally moved in the x-axis direction while it is rotated about the barycenter within the bottom surface of the container as the center.

It is desired that a rotation speed of the container at a charge filling point be lower than the spinning speed of the pitch fibers. More specifically, a spinning speed/rotation speed ratio is 1 to 200, preferably 10 to 100, and more preferably 20 to 60. When determining this speed ratio, not only the rotation speed of the container but also the moving speed of the reciprocal movement must be considered in a strict sense. However, the moving speed of the reciprocal movement is substantially negligible since it is lower as compared with that of the rotation speed.

The pitch fibers should be uniformly filled in the container while rotating the container simultaneously, such that a fiber volume content (Vf) of the carbon/carbon composite material is uniform at any portion. In attaining this object, the moving distance, the moving speed, the moving time and the like of the container with respect to the reciprocal movement can be controlled arbitrarily in accordance with the size or shape of the container. Preferably, two to ten charge filling positions are divisionally provided in the reciprocal direction, and the pitch fibers may be repeatedly filled in the container with a cycle of one to ten minutes by shifting the filling position while changing the respective charge filling times to be proportional to area ratios of the respective divisional portions. For example, three charge filling positions can be divisionally set in the reciprocal direction at the outer periphery, the intermediate portion, and the inner periphery, and the respective filling times can be changed in accordance with a ratio of (1.8 to 6):(1.2 to 4):(1).

If the speed ratio is less than the above-mentioned range, the pitch fibers may be blown off by the centrifugal force and cannot thus be uniformly filled in the container or the fibers may be disconnected, which is not preferable. If the speed ratio exceeds the above-mentioned range, a crack or deformation may occur in the carbon preform, or the pitch fibers cannot be uniformly filled in the container, which is not preferable.

In the carbon preform manufactured in this manner by filling, fibers tend to orient in the reciprocal direction. Hence, when a carbon/carbon composite material obtained by densifying such a carbon preform is utilized as a high-speed rotating body, e.g., a brake disk, it has an endurance against a shear stress which is generated by centrifugal force. Furthermore, this carbon preform can prevent occurrence of an internal defect, e.g., a crack, and can hold a shape substantially close to that of the target molded product even after calcination under pressure.

In the present invention, it is desirable that an areal fiber weight (mass per unit area) of the pitch fibers in the container be 4 to 100 kg/m$^2$, preferably 8 to 40 kf/m$^2$, the fiber volume content (Vf) thereof be 0.5 to 30 vol %, preferably 1 to 10 vol %, and more preferably 3 to 6 vol %, and a bulk density thereof be 10 to 500 kg/m$^3$, preferably 20 to 300 kg/m$^3$, and more preferably 30 to 100 kg/m$^3$.

If the areal fiber weight, the fiber volume content (Vf) or the bulk density is below the above-mentioned range, the shape holding ability of the carbon preform deteriorates, which is not preferable. If the areal fiber weight, fiber volume content (Vf), or the bulk density exceeds the above-mentioned range, a crack or deformation occurs in the carbon preform, leading to brittle fracture, which is not preferable.

Spinning and charge filling can be performed with or without greige goods. When greige goods are to be used, known ones, e.g., water or silicon-based greige goods, can be used. If the air-permeable container described above is used for drying the greige goods, the greige goods can be dried efficiently within 15 hours or less, preferably 7 hours or less, under normal pressure at a temperature of 100° C. or less, preferably 80° C. or less.

Although continuous fibers are mainly preferably used as the pitch fibers to be filled, short fibers can also be used. When short fibers are used, the length of the fiber is not particularly limited as far as its lower limit is 1 cm, preferably 5 cm, more preferably 10 cm, further more preferably 50 cm, and most preferably 1 m, and short fibers having an arbitrary length can be used. While being filled in the container, if the pitch fibers are cut partly or entirely so as to reach the lower limit mentioned above and are mixed, a filling density can be made uniform. In this case, mixing proportions of the continuous fibers and the cut fibers can be set arbitrarily. If the length of the short fibers does not reach the lower limit mentioned above, the bending strength and the tensile strength of the carbon/carbon composite material obtained by using this carbon preform decrease, which is not preferable.

It is preferable that the pitch fibers charged and filled in the container be directly subjected to infusibilization without being extracted from the container, so that occurrence of an internal defect, e.g., a crack, can be prevented.

Infusibilization can be performed in an oxidizing gas atmosphere at a temperature of 50° to 400° C., preferably 100° to 350° C. As the oxidizing gas, air, oxygen, oxynitride, oxysulfide, a halogen, or a mixture thereof can be used as required.

A wind velocity in which the above oxidizing gas passes through the pitch fibers filled in the air-permeable container is 0.2 to 4 m/sec, preferably 0.5 to 2 m/sec. If the container to be filled has an air permeability as described above, infusibilization can be performed more uniformly and more efficiently while requiring a lower gas pressure as compared to a case wherein it does not have air permeability. Thus, the shape of the fibers as they are filled can be easily maintained since a gas pressure can be lowered.

If the wind velocity is larger than the upper limit of the above-mentioned range, the pitch fibers filled in the container move around undesirably due to the influence of the wind pressure, so that the uniformity in areal fiber weight, fiber volume content or a bulk density of the fibers during filling cannot be easily maintained, which is not preferable. If the wind velocity is lower than the lower limit of the above-mentioned range, non-uniform infusibilization of the pitch fibers sometimes takes place in the container, leading to a crack, which is not preferable.

The infusibilization time is a time period after which the fiber no longer exhibits a heat fusibility. The lower limit of the infusibilization time is 10 minutes, preferably 30 minutes, and the upper limit thereof is 20 hours, preferably 10 hours.

If the infusibilization time does not reach the above-mentioned time range, the infusibilized fibers fuse together to easily cause cracking. If the infusibilization time exceeds the above-mentioned time range, the fiber loses its flexibility. Then, the shape of the fiber cannot be maintained, which is not preferable.

It is possible to transfer, before calcination and molding, the infusibilized fibers in the container which are obtained by infusibilization to a die for a uniaxial pressing while maintaining their shape. Alternatively, it is also preferable that the pitch fibers be uniaxially pressed and calcined in a container having a predetermined shape where they are filled and infusibilized. It is desirable that the material of the die be stainless steel, preferably SUS 304, graphite, or a carbonaceous material, e.g., a carbon/carbon composite material.

Calcination and molding under a uniaxial pressure can be achieved usually within 10 minutes to 10 hours, preferably 30 minutes to 4 hours, with a compression ratio of 5 to 20, preferably 6 to 15, and more preferably 7 to 10, and a temperature range of from an infusibilization temperature up to 2,000° C., preferably 300° to 1,500° C., and more preferably 400° to 1,000° C. The compression in this case can be performed with stroke control of the die as well in accordance with a desired thickness of the carbon preform. If the compression ratio of the stroke does not reach the lower limit of the above-mentioned range, the shape maintaining ability of the carbon preform becomes low, which is not preferable. If the compression ratio of the stroke exceeds the upper limit of the abovementioned range, a crack or deformation occurs in the carbon preform to easily lead to brittle fracture, which is not preferable.

Regarding the atmosphere of this case, calcination is preferably performed in a vacuum or under a reduced pressure, or a non-oxidizing atmosphere of nitrogen gas, argon gas, helium gas, or the like under a reduced pressure, elevated pressure, or normal pressure. The calcination can be performed even in an oxidizing atmosphere, e.g., air, as far as it is performed at a comparatively low temperature, e.g., 400° to 600° C., within a short period of time.

Examples of molding under a uniaxial pressure include molding under uniaxial pressure while heating the die, or uniaxial cold pressure molding and thereafter heating while maintaining compression. The thickness of the carbon preform can be arbitrarily controlled by employing these methods.

Regarding the calcination mentioned above, it is preferable that the product be calcined at a uniform temperature entirely so that it can substantially maintain the target shape.

Thus, the carbon preform is obtained. The fiber volume content (Vf) of this preform is 20 to 80 vol %, preferably 25 to 70 vol %. The lower limit of the bulk density is 100 kg/m$^3$, preferably 500 kg/m$^3$, more preferably 550 kg/m$^3$, and most preferably 600 kg/m$^3$. The upper limit of the bulk density is 2,000 kg/m$^3$, preferably 1,900 kg/m$^3$, and most preferably 1,850 kg/m$^3$.

If the fiber volume content (Vf) or the bulk density does not reach the lower limit of the above-mentioned range, the thermal conductivity in the direction off thickness and the mechanical physical properties, e.g., the bending strength or tensile strength, of the preform and the carbon/carbon composite material as the final molded product are lowered, which is not preferable. The shape maintaining ability also decreases, which is not preferable. If the fiber volume content (Vf) or the bulk density exceeds the upper limit of the above-mentioned range, a crack or deformation occurs in the carbon preform to lead to brittle fracture, which is not preferable.

Needle punching can also be performed before or after calcination and molding under a uniaxial pressure, in a direction perpendicular to a laminating direction of the fibers, preferably in the direction of thickness of the entire carbon preform. If needle punching is performed, not only the shape of the carbon preform can be maintained easily, but also the thermal conductivity of the carbon preform and the carbon/carbon composite material obtained by densifying the carbon preform in the direction of thickness can be improved, thereby improving the performance of the resultant heat resistant material and the brake material.

The lower limit of the thermal conductivity of the carbon preform in the direction of thickness at 25° C. is 0.1 W/m.K, preferably 0.2 W/m.K, and more preferably 0.3 W/m.K, and its upper limit is 2.0 W/m.K, preferably 1.0 W/m.K, and more preferably 0.8 W/m.K.

If the thermal conductivity of the carbon preform does not reach the lower limit of the above-mentioned range, the thermal conductivity of the carbon/carbon composite material as the final molded product also tends to decrease, which is not preferable for the raw material of a heat resistant material or slidable material.

The carbon preform can be subjected to calcination prior to densification. In this case, calcination is executed in a non-oxidizing atmosphere at 400° to 3,000° C., preferably 500° to 2,500° C.

The carbon preform obtained in this manner is densified, thereby obtaining a carbon/carbon composite material.

A method for densifying the carbon preform is not particularly limited as far as it can form a carbonaceous matrix, and a known method can be used to perform densification repeatedly until a target bulk density is achieved. In particular, a method in which a carbonaceous matrix is deposited and densified by chemical vapor deposition, and a method in which a carbonaceous matrix employing a pitch as a starting material and/or a carbonaceous matrix made of a phenolic resin, a furan resin or the like is impregnated, calcined and densified, or a method as a combination of these methods is preferably employed.

DESCRIPTION OF THE PREFERRED EMBODIMENTS

The present invention will be described in detail by way of following Examples and Comparative Examples.

EXAMPLE 1

An inner cylinder having the same height as that of an outer cylinder was concentrically arranged in the outer cylinder. A conical lid was placed on the top portion of the inner cylinder. An annular cylindrical container was thus formed. This annular cylindrical container was made of SUS 304, and had the inner cylinder with an outer diameter of 100 mm, the outer cylinder with an inner diameter of 400 mm and a height of 300 mm, and a porosity of 50%. The interior of the cylindrical container was divided into three portions at a pitch of 50 mm into the outer periphery, the intermediate portion and the inner periphery in the reciprocal direction. Pitch fibers having an average diameter of 13 μm, which were obtained by melt spinning an optical anisotropic petroleum-derived pitch having a softening point of 280° C. at a rate of 300 m/min, were filled in this annular cylindrical container uniformly to a height of 230 mm with (spinning speed)/(the rotation speed of the container)=30 to achieve an areal fiber weight of 14 kg/m$^2$, while repeatedly moving the filling position every two minutes with respective filling times at the ratio of [1:1.7:2.3]. At this time, the fiber volume content (Vf) and the bulk density of the pitch fibers filled in the container were 5 vol % and 60 kg/m$^3$, respectively.

While maintaining the shape as they were filled, the pitch fibers were subjected to infusibilization in air together with the cylindrical container. Then, while maintaining the shape as they were infusibilized, the pitch fibers were transferred from the cylindrical container to a graphite cylindrical die for uniaxial pressing. Calcination and molding were performed at 1,000° C. for one hour under a uniaxial pressure by hot pressing with a stroke compression ratio of 10. Then, a carbon preform having a fiber volume content (Vf) of 37 vol % and a bulk density of 630 kg/m$^3$ was obtained.

When this carbon preform was extracted from the die, it maintained its shape completely. When this carbon preform was subjected to a non-destructive inspection by an X-ray CT scanner and thereafter cutting inspection, no internal defect, e.g., a crack, was observed. A good preform was thus obtained. When the thermal conductivity of this preform was measured at 25° C. in the direction of thickness, it was 0.6 W/m.K.

The thermal conductivity was calculated in accordance with JIS A 1412-1977 (flat plate comparison method). The sample was made into a length of 200 mm±3%, a width of 200 mm±3%, and a thickness of 10 to 25 mm. As a standard plate, one obtained by coating glass-wool with a polycarbonate resin was used. The sample and the standard plate were stacked and sandwiched between a high-temperature heat source and a low-temperature heat source, and the thermal conductivity was calculated in accordance with the following equation (1):

$$\lambda = \lambda_0 \times (\ell / \ell_0) \times (\theta_2 - \theta_1)/(\theta_3 - \theta_2) \quad (1)$$

where $\theta_1$ is the low temperature-side surface temperature (°C.) of the standard plate, $\theta_2$ is the high temperature-side surface temperature (°C.) of the standard plate and the low temperature-side surface temperature of the sample, $\theta_3$ is the high temperature-side surface temperature (°C.) of the sample, $\lambda$ is the thermal conductivity (W/m.K) of the sample at an average temperature $((\theta_3+\theta_2)/2)$, $\lambda_0$ is the thermal conductivity (W/m.K) of the standard plate at an average temperature $((\theta_2+\theta_1)/2)$, and $\ell$ and $\ell_0$ are the thicknesses (m) of the sample and the standard plate, respectively.

The carbon preform obtained in this manner was impregnated with a meso pitch having a softening point of 280° C., and was carbonized by heating at 1,500° C. under a uniaxial pressure of 980 kPa. A carbon/carbon composite material obtained by repeating impregnation and carbonization twice each had no internal defect and was thus good as the brake material.

EXAMPLE 2

The same pitch fibers as those of Example 1 were filled in a cylindrical container under the same conditions as in Example 1 except that (spinning speed)/(rotation speed of the container) was set to 60. At this time, the fiber volume content (Vf) and the bulk density of the pitch fibers filled in the container were 8 vol % and 110 kg/m$^3$, respectively.

While maintaining the shape as they were filled, the pitch fibers were subjected to infusibilization in air together with the cylindrical container. Then, while maintaining the shape as they were infusibilized, the pitch fibers were transferred from the cylindrical container to a graphite cylindrical die for uniaxial pressing. Calcination and molding were performed at 1,000° C. for one hour under a uniaxial pressure by hot pressing with a stroke compression ratio of 10. Then, a carbon preform having a fiber volume content (Vf) of 60 vol % and a bulk density of 1110 kg/m$^3$ was obtained.

When this carbon preform was extracted from the die, it maintained its shape completely. When this carbon preform was subjected to a non-destructive inspection by the X-ray CT scanner and thereafter cutting inspection, no internal defect, e.g., a crack, was observed. A good preform was thus obtained. When the thermal conductivity of this preform was measured at 25° C. in the direction of thickness, it was 0.6 W/m.K.

EXAMPLE 3

The same pitch fibers as those of Example 1 were filled in a cylindrical container under the completely same conditions as in Example 1. At this time, the fiber volume content (Vf) and the bulk density of the pitch fibers filled in the container were 5 vol % and 60 kg/m$^3$, respectively.

While maintaining the shape as they were filled, the pitch fibers were subjected to infusibilization in air together with the cylindrical container. Then, while maintaining the shape as they were infusibilized, the pitch fibers were transferred from the cylindrical container to a graphite cylindrical die for uniaxial pressing. Calcination and molding were performed at 1,000° C. for one hour under a uniaxial pressure by hot pressing with a stroke compression ratio of 6. Then, a carbon preform having a fiber volume content (Vf) of 26 vol % and a bulk density of 510 kg/m$^3$ was obtained.

When this carbon preform was extracted from the die, it maintained its shape completely. When this carbon preform was subjected to a non-destructive inspection by the X-ray CT scanner and thereafter cutting inspection, no internal defect, e.g., a crack, was observed. A good preform was thus obtained. When the thermal conductivity of this preform was measured at 25° C. in the direction of thickness, it was 0.6 W/m.K.

EXAMPLE 4

The same pitch fibers as those of Example 1 were filled in a cylindrical container under the same conditions as in Example 1 except that as the cylindrical container, are made of SUS 304 and having a porosity of 25% was employed. At this time, the fiber volume content (Vf) and the bulk density of the pitch fibers filled in the container were 5 vol % and 60 kg/m$^3$, respectively.

While maintaining the shape as they were filled, the pitch fibers were subjected to infusibilization in air together with the cylindrical container. Then, while maintaining the shape as they were infusibilized, the pitch fibers were transferred from the cylindrical container to a graphite cylindrical die for uniaxial pressing. Calcination and molding were performed at 1,000° C. for one hour under a uniaxial pressure by hot pressing with a stroke compression ratio off 10. Then, a carbon preform having a fiber volume content (Vf) of 39 vol % and a bulk density of 660 kg/m$^3$ was obtained.

When this carbon preform was extracted from the die, it maintained its shape completely. When this carbon preform was subjected to a non-destructive inspection by the X-ray CT scanner and thereafter cutting inspection, no internal defect, e.g., a crack, was observed. A good preform was thus obtained. When the thermal conductivity of this preform was measured at 25° C. in the direction of thickness, it was 0.5 W/m.K.

EXAMPLE 5

The interior of a cylindrical container made of SUS 304 and having an outer diameter of 400 mm, a height of 300 mm and a porosity of 50% was divided into four portions at a pitch of 50 mm into the outer periphery, intermediate portion (1), intermediate portion (2) and the inner periphery in the reciprocal direction. Pitch fibers having an average diameter of 13 μm, which were obtained by melt spinning an optical anisotropic petroleum-derived pitch having a softening point of 280° C. at a rate of 300 m/min, were filled in this cylindrical container uniformly to a height of 230 mm with (spinning speed)/(rotation speed of the container)=30 to achieve an areal fiber weight of 14 kg/m$^2$, while repeatedly moving the filling position every 2.5 minutes with respective filling times at the ratio of [1:3:5:7]. At this time, the fiber volume content (Vf) and the bulk density of the pitch fibers filled in the container were 5 vol % and 60 kg/m$^3$, respectively.

While maintaining the shape as they were filled, the pitch fibers were subjected to infusibilization in air together with the cylindrical container. Then, while maintaining the shape as they were infusibilized, the pitch fibers were transferred from the cylindrical container to a graphite cylindrical die for uniaxial pressing. Calcination and molding were performed at 1,000° C. for one hour under a uniaxial pressure by hot pressing with a stroke compression ratio of 10. Then, a carbon preform having a fiber volume content (Vf) of 39 vol % and a bulk density of 660 kg/m$^3$ was obtained.

When this carbon preform was extracted from the die, it maintained its shape completely. When this carbon preform was subjected to a non-destructive inspection by the X-ray CT scanner and thereafter cutting inspection, no internal defect, e.g., a crack, was observed. A good preform was thus obtained. When the thermal conductivity of this preform was measured at 25° C. in the direction of thickness, it was 0.7 W/m.K.

Comparative Example 1

Pitch fibers having an average diameter of 13 μm, which were obtained by melt spinning an optical anisotropic petroleum-derived pitch having a softening point of 280° C., were subjected to infusibilization in air, thus obtaining infusibilized fibers. These infusibilized fibers were filled in a cylindrical graphite die for uniaxial pressing which had an outer diameter of 400 mm and an inner diameter of 100 mm, to a height of 230 mm divisionally with the same filling times as in Example 1 in accordance with continuous drop deposition from the top. The thus filled fibers were then subjected to calcination and molding at 1,000° C. for one hour under a uniaxial pressure by hot pressing with a stroke compression ratio of 10. A carbon preform having a fiber volume content (Vf) of 42 vol % and a bulk density of 700 kg/m$^3$ was thus obtained.

When this carbon preform was extracted from the die, although it maintained its shape and no cracks were formed, a swell was observed at the central portion. When this carbon preform was subjected to a non-destructive inspection by the X-ray CT scanner in the direction of thickness, a crack having a length of about 130 mm and a width of about 4 to 5 mm was found in the internal portion of the preform-mentioned to the swell. This crack was confirmed in later cutting inspection as well. As a result, this product could not be used as a carbon preform.

Comparative Example 2

Pitch fibers having an average diameter of 13 μm, which were obtained by melt spinning an optical anisotropic petroleum-derived pitch having a softening point of 280° C., were subjected to infusibilization in air, thus obtaining infusibilized fibers. These infusibilized fibers were filled in a cylindrical graphite die for uniaxial pressing which had a diameter of 400 mm, to a height of 230 mm divisionally with the same filling times as in Example 5 in accordance with continuous drop deposition from the top. The thus filled fibers were then subjected to calcination and molding at 1,000° C. for one hour under a uniaxial pressure by hot pressing with a stroke compression ratio of 8. A carbon preform having a fiber volume content (Vf) of 40 vol % and a bulk density of 680 kg/m$^3$ was thus obtained.

When this carbon preform was extracted from the die, it maintained its shape, and no cracks were observed. Also, no change in thickness caused by a swell was detected. Thus, this carbon preform seemed to have a good moldability. When, however, this carbon preform was subjected to a non-destructive inspection by the X-ray CT scanner, a crack having a length of about 220 mm and a width of 1 to 2 mm was found inside the preform. This crack was confirmed in later cutting inspection as well. As a result, this product could not be used as a carbon preform.

EFFECTS OF THE INVENTION

According to the manufacturing method of the present invention, a carbon preform and a carbon/carbon composite material having a good moldability can be manufactured at a very high yield with a simple process.

What is claimed is:

1. A method for manufacturing a carbon preform comprising the steps of charging a container having an air-permeable bottom and/or side surface with pitch fibers obtained by melt spinning a carbonaceous pitch to fill the container during spinning in such a manner that a fiber volume content (Vf) of a carbon/carbon composite material is uniform at any portion and the fiber volume content of the pitch fibers in the container is 3 to 30 vol % by rotating the container at a spinning speed/rotation speed ratio of from 1 to 200 and wherein the pitch fibers are repeatedly filled in the container with a cycle of one to ten minutes by shifting the filling position while changing the respective charge filling times to be proportional to the area ratios of two to ten charging filling positions divisionally provided in a reciprocal direction of the container, infusibilizing the thus filled pitch fibers at a wind velocity of from 0.2 to 4 m/sec of an oxidizing gas passing through the pitch fibers filled in the air-permeable container while the shape of the pitch fibers as they are filled is maintained and, calcining and molding the infusibilized pitch fibers under a uniaxial pressure at a temperature range of from an infusibilization temperature up to 2,000° C.

2. A method according to claim 1, wherein a porosity of the side and/or bottom surface of said container is from 10 to 80%.

3. A method according to claim 1, wherein a spinning speed of said pitch fibers is from 50 to 2,000 m/min.

4. A method according to claim 1, wherein a rotation speed of the container is lower than the spinning speed of the pitch fibers.

5. A method according to claim 1, wherein an areal fiber weight of said pitch fibers in the container is from 4 to 100 kg/m².

6. A method according to claim 1, wherein continuous fibers are used as the pitch fibers to be filled.

7. A method according to claim 1, wherein the pitch fibers filled in the container are directly subjected to infusibilization.

8. A method according to claim 1, wherein said infusibilization is performed in an oxidizing gas atmosphere at a temperature of from 50° to 400° C.

9. A method according to claim 8, wherein an infusibilization time is from 10 minutes to 20 hours.

10. A method according to claim 1, wherein the pitch fibers are uniaxially pressed and calcined in the container where they were filled and infusibilized.

11. A method according to claim 1, wherein said calcination and molding under a uniaxial pressure are conducted within 10 minutes to 10 hours with a compression ratio of from 5 to 20.

12. A method according to claim 1, wherein a needle punching treatment is performed in a direction perpendicular to a laminating direction of the fibers before or after said calcination and molding under a uniaxial pressure.

13. A method for manufacturing a carbon/carbon composite material comprising densifying the carbon preform according to claim 1.

14. A method according to claim 13, wherein said carbon preform is subjected to a calcination treatment under a non-oxidizing atmosphere at 400° to 3,000° C. prior to densification.

15. A method according to claim 1, wherein the pitch fibers are uniaxially pressed and calcined after being transferred from a cylindrical container where they were filled and infusibilized to a graphite cylindrical die while maintaining the shape in which they are infusibilized.

* * * * *